United States Patent [19]

Hikari

[11] 4,217,775
[45] Aug. 19, 1980

[54] LOAD TESTING APPARATUS

[76] Inventor: Kazuo Hikari, 29-2 2-chome, Minami kaneden, Suita-shi, Osaka, Japan

[21] Appl. No.: 12,967

[22] Filed: Feb. 21, 1979

[30] Foreign Application Priority Data

Jun. 2, 1978 [JP] Japan ................................. 53-75900

[51] Int. Cl.² .............................................. G01L 3/20
[52] U.S. Cl. ..................................................... 73/135
[58] Field of Search ................ 73/135, 117; 188/1 R, 188/1 A

[56] References Cited

U.S. PATENT DOCUMENTS

| 854,720 | 5/1907 | Dawson | 73/135 X |
| 4,109,519 | 10/1978 | Bartlett et al. | 73/135 |

Primary Examiner—Jerry W. Myracle
Attorney, Agent, or Firm—George B. Oujevolk

[57] ABSTRACT

The invention relates to a load testing apparatus comprising disks, a rotary shaft connectable with a machine to be tested, disk brakes for braking the disks, and a detector adapted to indicate the amount of load applied to the machine to be tested by detecting the rotational force under pressure with interposition of the supporting members of the disk brakes at the time of braking, thereby enabling to test the characteristics and durability of engines, motors, agricultural machines, decelerators, transmissions, clutches, torque converters, chains, belts, couplings, compressed air or hydraulic motors and the like, as well as to conduct an exhaust gas test and power test of vehicles, particularly enabling to detect the output horsepower applied to the machine to be tested from the rotational force and the number of rotations per minute.

Futhermore, the load testing apparatus according to invention is characterized in that it enables to conduct a test starting from zero rotational frequency; it has stabilized properties capable of standing the application of continuous load; the load can be optionally adjusted or varied with simplicity; high torque is applicable at low-speed rotation; and it can be designed compactly.

3 Claims, 4 Drawing Figures

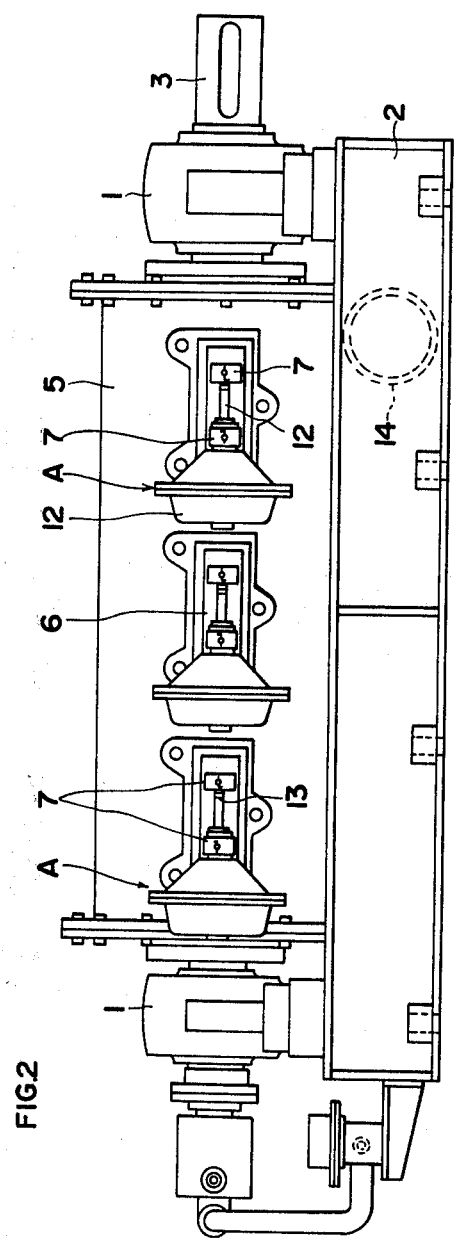

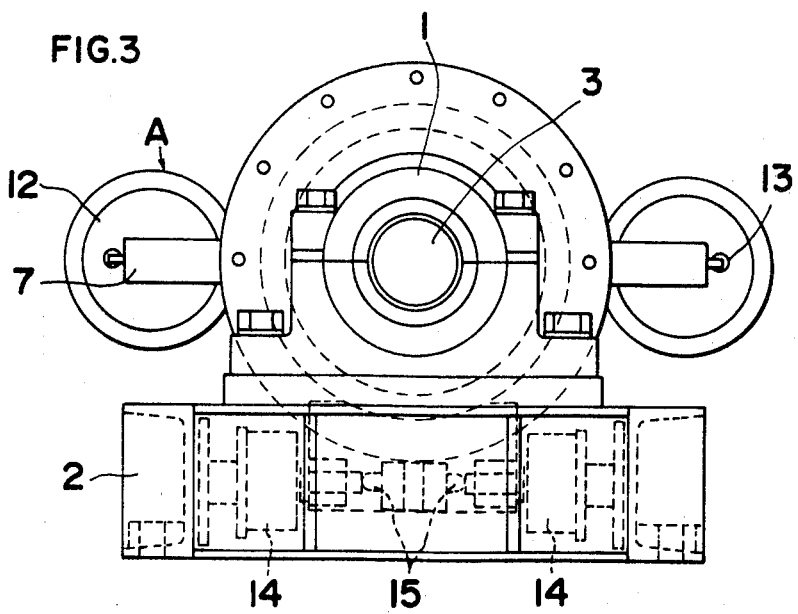

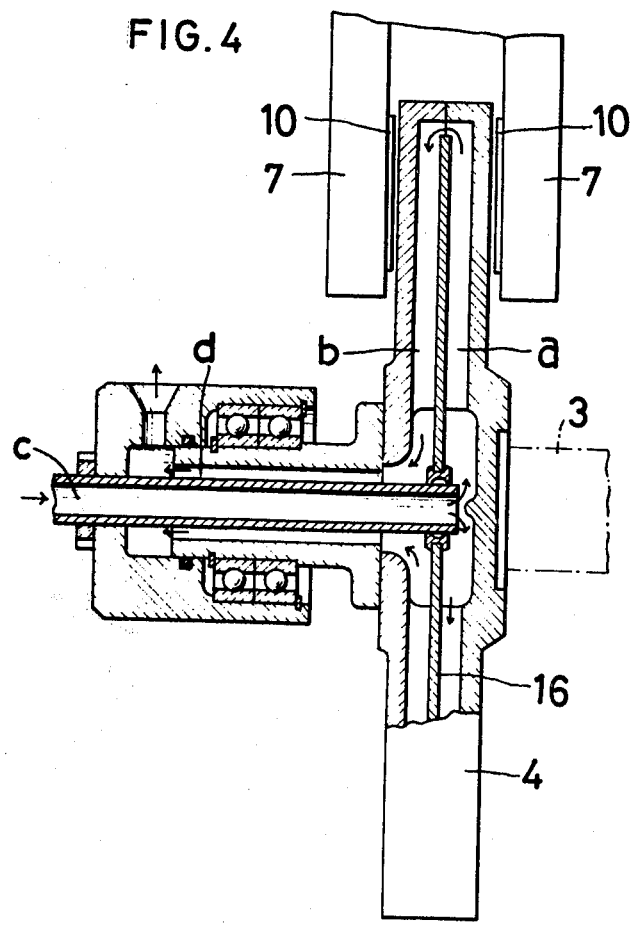

LOAD TESTING APPARATUS

The invention relates to a load testing apparatus, and more particularly to a load testing apparatus comprising pressure fluid driven disk brakes and internal cooling water forced circulation system disks. The apparatus is for use in the test of continuous load, intermittent load, continuous variable load and intermittent wave load applied to engines, transmissions, motors, belts, etc.

The invention has for an object to provide a compact load testing apparatus suitable for high torque at low-speed rotation.

Generally, conventional power testers of this type were not capable of conducting a test at a low-speed rotation, to say nothing of zero rotational frequency. The apparatus according to the invention has enabled to conduct a test not only at a low-speed rotation but also at zero rotational frequency.

Other objects and advantages of the invention will become apparent from the following description and the accompanying claims. The annexed drawings are intended to illustrate the invention and are not to be construed to limit the scope of the invention.

FIG. 2 is an elevational view of the same.

FIG. 3 is a side view of the same.

FIG. 4 is a diagram showing the water cooling system of the disk.

Figure 1:
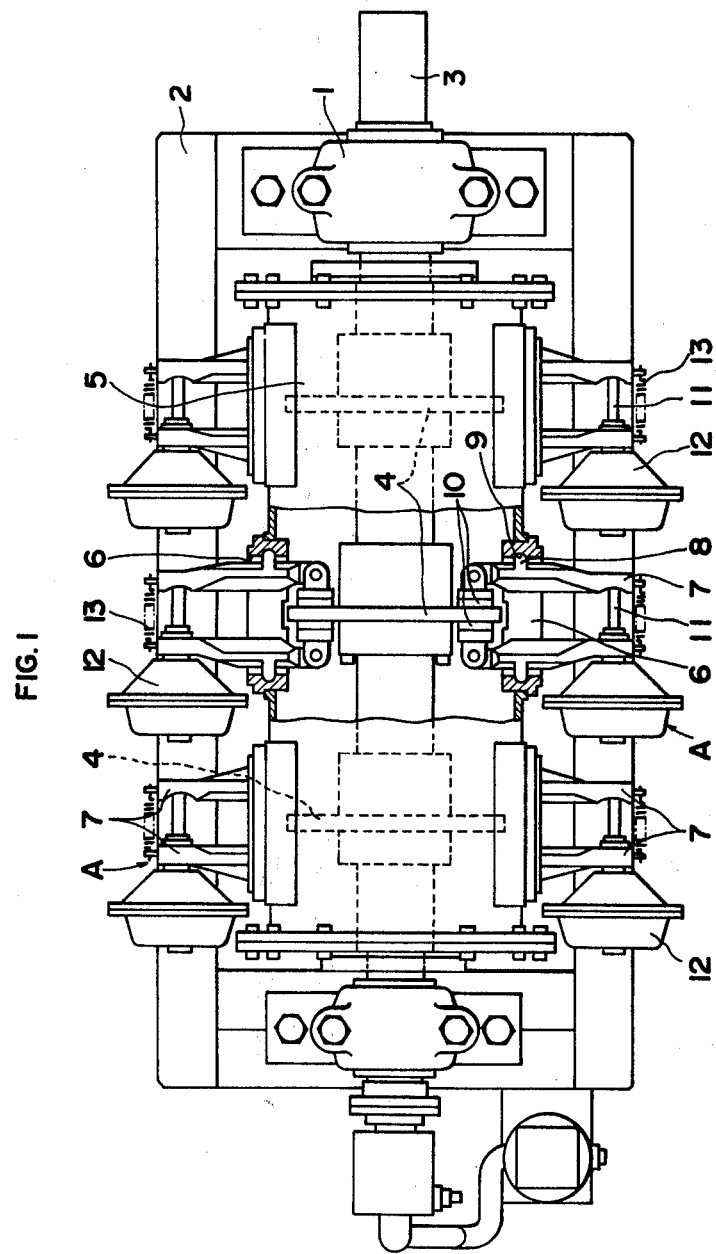
FIG. 1 is a plan view, broken away in part, of an apparatus according to the invention suitable for conducting multiple modes of tests.

The illustrated load testing apparatus according to the invention comprises a rotary shaft connectable with a machine to be tested, a plurality of spaced disks mounted on the rotary shaft so as to be integrally rotatable therewith, disk brakes for braking the disks, and a detector for detecting the load applied to the machine to be tested from the rotational pressure exerted on the bearing members of the disk brakes at the time of braking. The apparatus will be described in detail hereinunder in reference to the accompanying drawings.

In the drawings, the numeral 1 designates a bearing correspondingly provided at each end of a seat frame 2 of the apparatus. A rotary shaft 3 is rotatably supported by the bearings 1,1.

The rotary shaft 3 is connectable at one end thereof with a machine to be tested. A plurality of disks 4 are spaced on the rotary shaft 3 so as to be integrally rotatable therewith. The numeral 4 designates a rigid tubular member fitted coaxially onto the rotary shaft 3 so as to cover the rotary shaft 3 and the disks 4.

The tubular member 5 is rotatably pivoted at both ends thereof on the rotary shaft 3. To be more precise, the tubular member 5 is free from the rotation of the rotary shaft 3 though slightly oscillatable at its center.

The tubular member 5 is provided with ports 6. The position of each port 6 corresponds with the position of each disk 4 mounted on the rotary shaft 3. These ports 6 are bored in order to install disk brakes for braking the disks 4.

As is shown in FIG. 1, a pair of disk brakes (A) are disposed on both sides of each disk 4 in the circumferential direction thereof. In the illustrated embodiment, 3 pairs of disk brakes (A), totalling 6, are provided relative to 3 disks. However, it is not necessarily imperative to provide disk brakes (A) on both sides of each disk 4; only one disk brake (A) on either side of the disk 4 will also suffice. Furthermore, the number of disks 4 and that of disk brakes (A) are not restricted to those of the illustrated embodiment but can be one only, respectively.

Each disk brake (A) is mounted on the tubular member 5 by fitting projections 8 provided on a pair of oscillators 7,7 constituting a part of the disk brake (A) into recesses 9 of the port 6, respectively.

Each disk brake (A) comprises a pair of oscillators 7,7 a pair of friction plates 10 provided on the forward ends of the oscillators so as to be disposed on both sides of the disk 4, an actuater 12 having a piston spindle 11 adapted to project through one oscillator 7 with its forward end abutting the other oscillator 7, and a spring 13 provided between the base ends of each pair of oscillators 7,7.

The actuator 12 comprises a cylinder and a piston spindle 11 projectable by air or oil pressure applied to said cylinder. The spring 13 imparts elasticity to each pair of oscillators 7,7 so that the friction plates 10 at the forward ends thereof are detached from each other. Each pair of oscillators 7,7 are opened and closed with the respective projections as fulcrums. Compressed air or pressure oil is supplied to and discharged from each actuator 12 through a supply pile and a discharge pipe, respectively.

The numeral 14 designates a detector, such as a load cell and the like, provided on the seat frame. The detector 14 detects the load from the machine to be tested through the rotational force developed on the tubular member 5 and takes it out as a quantity of electricity. To be more precise, the load is detected by pressing the detector 14 with pressers 15, the relative torque being detected from the action radius of the tubular member 5.

The heat developed when the friction plates 10 are brought into pressure contact with the disk 4 by the action of the disk brakes (A) is absorbed as follows. As shown in FIG. 4, for example, the interior of the disk 4 is divided into two compartments (a) and (b) by a partition 16 so that cooling water supplied through a supply duct inside the rotary shaft 3 can travel through the compartments (a) and (b) inside the disk 4 in the arrow-indicated direction until it is discharged through a discharge duct (d) inside said rotary shaft 3.

The foregoing is the construction of the load testing apparatus according to the invention. When a load test is conducted, the output shaft of a machine to be tested, such as an engine, a motor and the like, is connected with the rotary shaft 3, said rotary shaft 3 being driven by the operation of the machine to be tested. When the disk brakes (A) are not actuated, the disks 4 are free from the friction plates 10, the tubular member 5 developing no rotational force, the machine to be tested being driven under a loadless state.

In order to apply load to the machine to be tested, pressure fluid is supplied to the actuators 12 of the disk brakes (A) thereby causing the piston spindles 11 to project. Thus, the base ends of each pair of oscillators 7,7 are pressed in the opening direction, the friction plates 10 mounted on the forward ends of the oscillators 7,7 being brought into pressure contact with the interposed disk 4 thereby applying the brake to the rotary shaft 3.

As a result of the braking, load is applied to the machine connected to the rotary shaft 3 thereby enabling to conduct a load test. When load is applied to the machine to be tested by braking the rotary shaft 3, a rotational force in the same direction as the rotary shaft 3 is imparted to the tubular member 5 provided with disk brakes (A), the detector 14 being compressed by the pressers 15 due to said rotational force.

The rotational force of the tubular member 5 is a compressing force of the disk brakes (A) to the disks 4. This force is developed in direct proportion to the load applied to the machine to be tested. Thus, the detector 14 is pressed by a force proportional to the load, whereby the detector 14 is enabled to detect the value of load applied to the machine to be tested with precision.

The load test can be conducted in a variety of modes in accordance with the purpose and the kind of machine to be tested. Some of the modes will be described hereinunder by way of example.

A continuous load test by constantly supplying pressure fluid under a predetermined pressure to the actuator 12; an intermittent load test by applying the aforesaid load in repetition with an interval of a suitable space of time; a continuous variable load test by switching the initial low pressure fluid to high pressure fluid after a predetermined space of time; and an intermittent wave load test by alternating the supply and discharge of pressure fluid through a switchover operation of the supply and discharge valves in brief cycles. Thus, the apparatus according to the invention enables to conduct tests not only in a wider variety of modes but also in modes closer to the actual use.

According to the invention, the disk brakes (A) for braking each disk 4 are adapted to be supported by the respective ports 6 of the tubular member 5 mounted on the rotary shaft 3 thereby rendering it unnecessary to provide a frame on each disk brake (A).

The invention has a further advantage in that a compact apparatus is obtainable since each disk brake (A) is mounted on a single rigid tubular member 5.

What is claimed is:

1. A load testing apparatus, comprising:

(a) a rotary shaft supported by bearings, said rotary shaft being connectable with a machine to be tested;
    (b) a rigid tubular member fitted onto the rotary shaft;
    (c) at least one or more disks mounted on said rigid tubular member so as to be rotatable with said rotary shaft;
    (d) ports on said rigid tubular member in positions located at least on one side of the circumferential direction of the disks;
    (e) at least one or more disk brakes including bearing members, for braking said disk or disks, said disk brakes being mounted on said ports; and,
    (f) a detector, coupled to said disk brakes, capable of detecting the load applied to the machine to be tested from a force applied to the bearing member of the disk brakes at the time of braking.

2. A load testing apparatus as defined in claim 1 wherein each of the disk brakes and bearing members comprises a pair of oscillators, a friction plate provided on the forward end of each of said oscillators adapted so as to be brought into pressure contact with the disk, an actuator having a piston spindle projecting through one of the oscillators and abutting the other oscillator, and a spring provided between each pair of oscillators, the actuater being adapted to project the piston spindle under air or oil pressure to bring the friction plates into pressure contact with the disk thereby enabling to brake the rotary shaft, the projection of the piston spindle of the actuater being under an intermittent wave load in high cycles.

3. A load testing apparatus as defined in claim 2 wherein the rigid tubular member as the supporting member of disk brakes is provided with pressers, the load being detected by pressing the detector with said pressers, the relative torque being detected from the radius of action of the tubular member.

* * * * *